United States Patent
Furusawa et al.

(10) Patent No.: US 6,338,081 B1
(45) Date of Patent: *Jan. 8, 2002

(54) MESSAGE HANDLING METHOD, MESSAGE HANDLING APPARATUS, AND MEMORY MEDIA FOR STORING A MESSAGE HANDLING APPARATUS CONTROLLING PROGRAM

(75) Inventors: Osamu Furusawa, Sagamihara; Akifumi Nakda, Kawasaki; Toshihiro Suzuki, Yokohama; Hajime Tsuchitani, Kamakura, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,130

(22) Filed: Jun. 5, 1998

(30) Foreign Application Priority Data

Jun. 12, 1997 (JP) ............................................... 9-154688

(51) Int. Cl.⁷ ........................ G06F 15/16; G06F 15/173; G06F 9/44
(52) U.S. Cl. ........................ 709/202; 709/206; 709/223; 709/317
(58) Field of Search ................................ 709/202, 206, 709/223, 303, 317; 707/201

(56) References Cited

U.S. PATENT DOCUMENTS

| | | | |
|---|---|---|---|
| 5,603,031 A | 2/1997 | White et al. ................. 395/683 |
| 5,611,050 A | * 3/1997 | Theimer et al. ............. 709/202 |
| 5,724,575 A | * 3/1998 | Hoover et al. ................. 707/10 |
| 5,768,505 A | * 6/1998 | Gilchrist et al. ............. 709/202 |
| 5,790,789 A | * 8/1998 | Suarez ........................ 709/202 |
| 5,815,665 A | * 9/1998 | Teper et al. ................. 709/229 |
| 5,822,585 A | * 10/1998 | Noble et al. ................. 709/202 |
| 5,826,020 A | * 10/1998 | Randell ...................... 709/202 |
| 5,845,267 A | * 12/1998 | Ronen |
| 5,855,008 A | * 12/1998 | Goldhaber et al. ......... 709/202 |
| 5,862,490 A | * 1/1999 | Sasuta et al. ................ 455/525 |
| 5,884,324 A | * 3/1999 | Cheng et al. ................ 707/201 |
| 5,887,171 A | * 3/1999 | Tada et al. .................. 709/303 |
| 6,012,083 A | * 3/1999 | Savitzky et al. ............ 709/202 |
| 5,937,161 A | * 8/1999 | Mulligan et al. ........... 709/206 |
| 5,961,594 A | * 10/1999 | Bouvier et al. ............. 709/223 |
| 5,961,595 A | * 10/1999 | Kawagoe et al. ........... 709/223 |
| 6,006,260 A | * 12/1999 | Barrick, Jr. et al. ........ 709/202 |
| 6,047,310 A | * 4/2000 | Kamakura et al. .......... 709/201 |
| 6,055,512 A | * 4/2000 | Dean et al. |
| 6,065,039 A | * 5/2000 | Paciorek ..................... 709/202 |
| 6,119,229 A | * 9/2000 | Martinez et al. ............ 713/200 |

* cited by examiner

Primary Examiner—Robert B. Harrell
Assistant Examiner—Almari Romero
(74) Attorney, Agent, or Firm—Jerry W. Herndon; Marcia L. Doubet, Esq.

(57) ABSTRACT

The broker agent asks a facilitator agent to locate a service provider agent which is involved in its own job. The broker agent, upon receiving from a regular agent a message packet indicating a request for mediation of a job, analyzes the message packet to judge the outline of the requested job and applies certain conversion to the request message for sending it to the service provider agent which is relevant to the request. The broker agent receives a reply from the service provider agent and sends it to the regular agent after applying certain conversion.

20 Claims, 8 Drawing Sheets

[Figure 1]
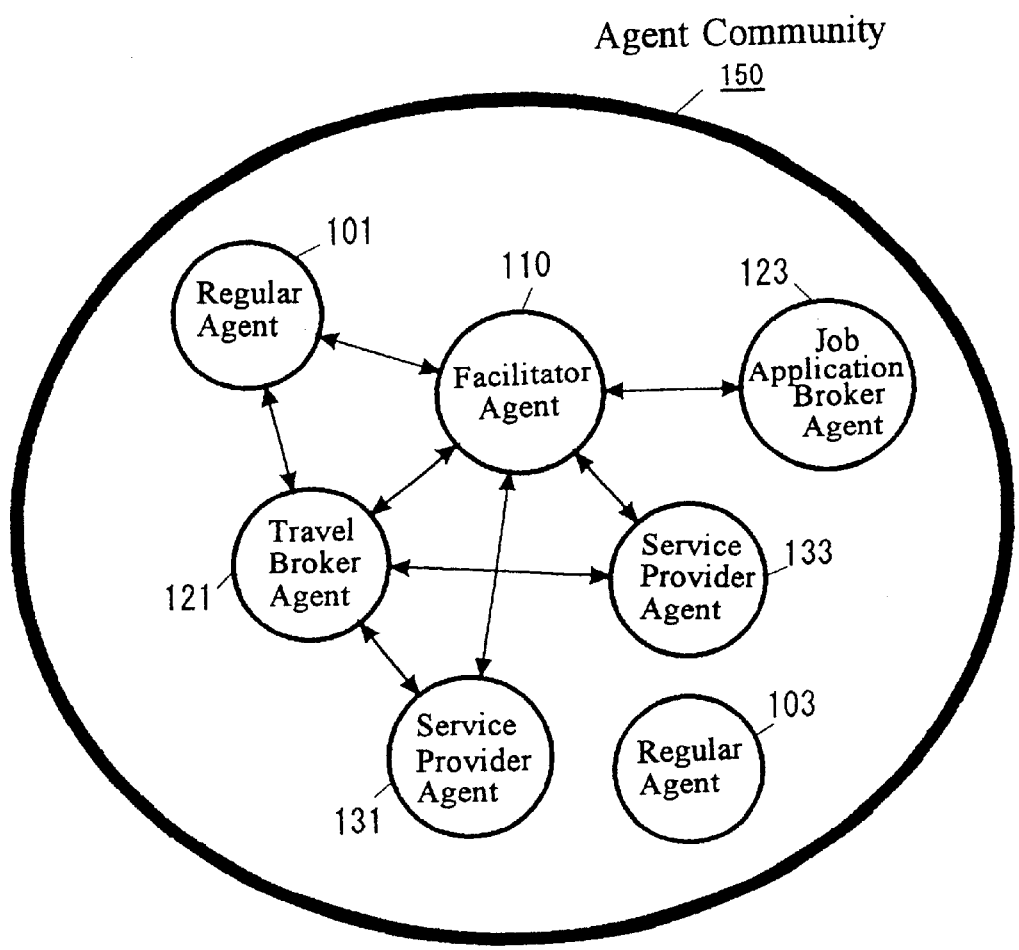

[Figure 2]
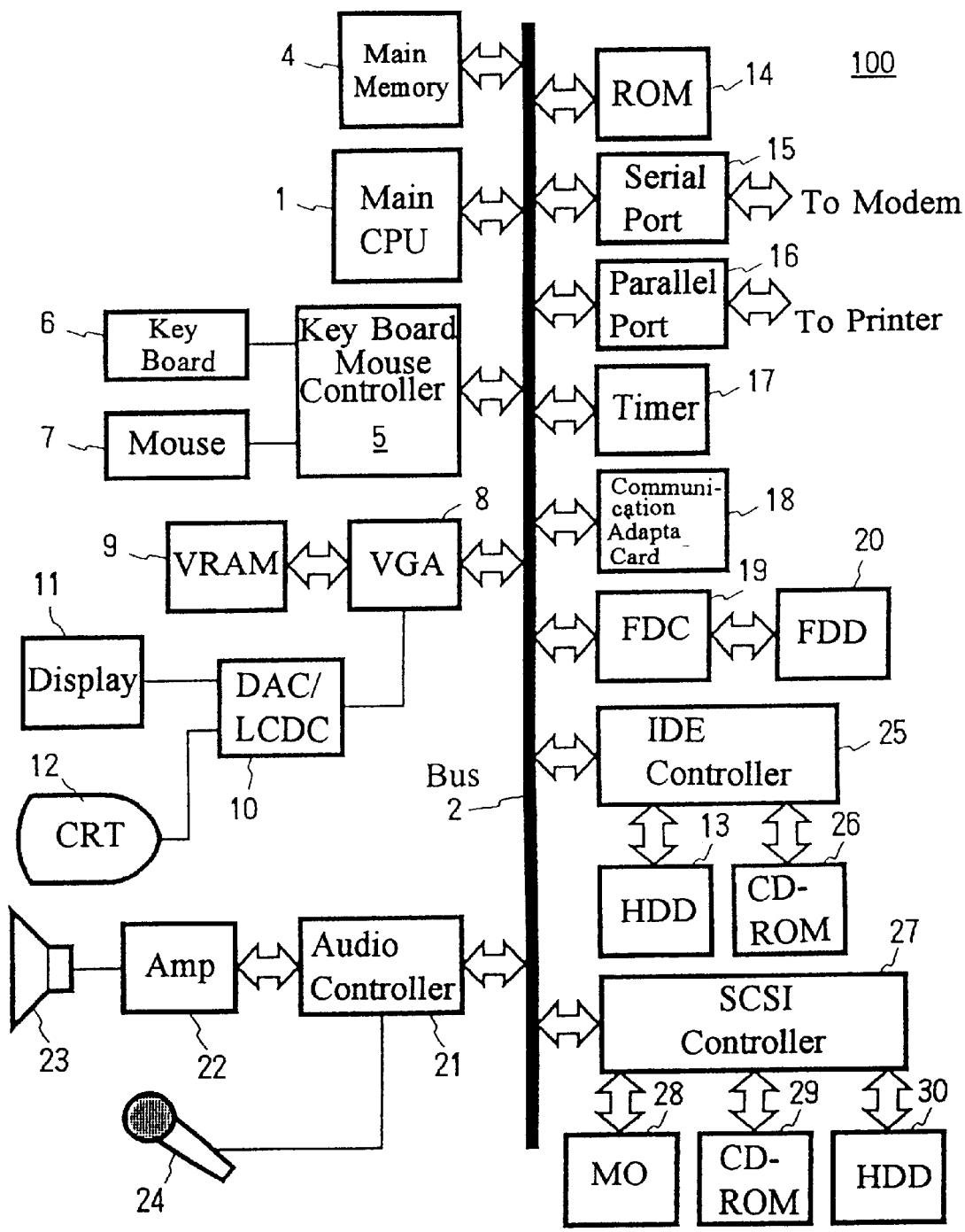

[Figure 3]
Message Packet 300
| | |
|---|---|
| Message Type | 301 |
| Sender | 303 |
| Receiver | 305 |
| Response ID | 307 |
| Conversation ID | 309 |
| Describing Language Type | 311 |
| Ontology | 313 |
| Content | 315 |
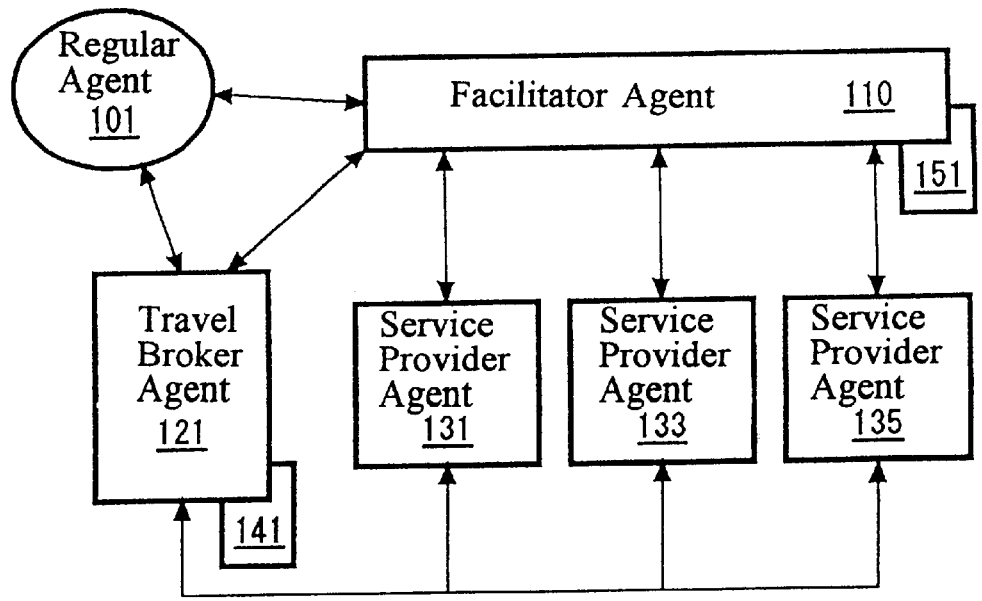
[Figure 4]

[Figure 5]
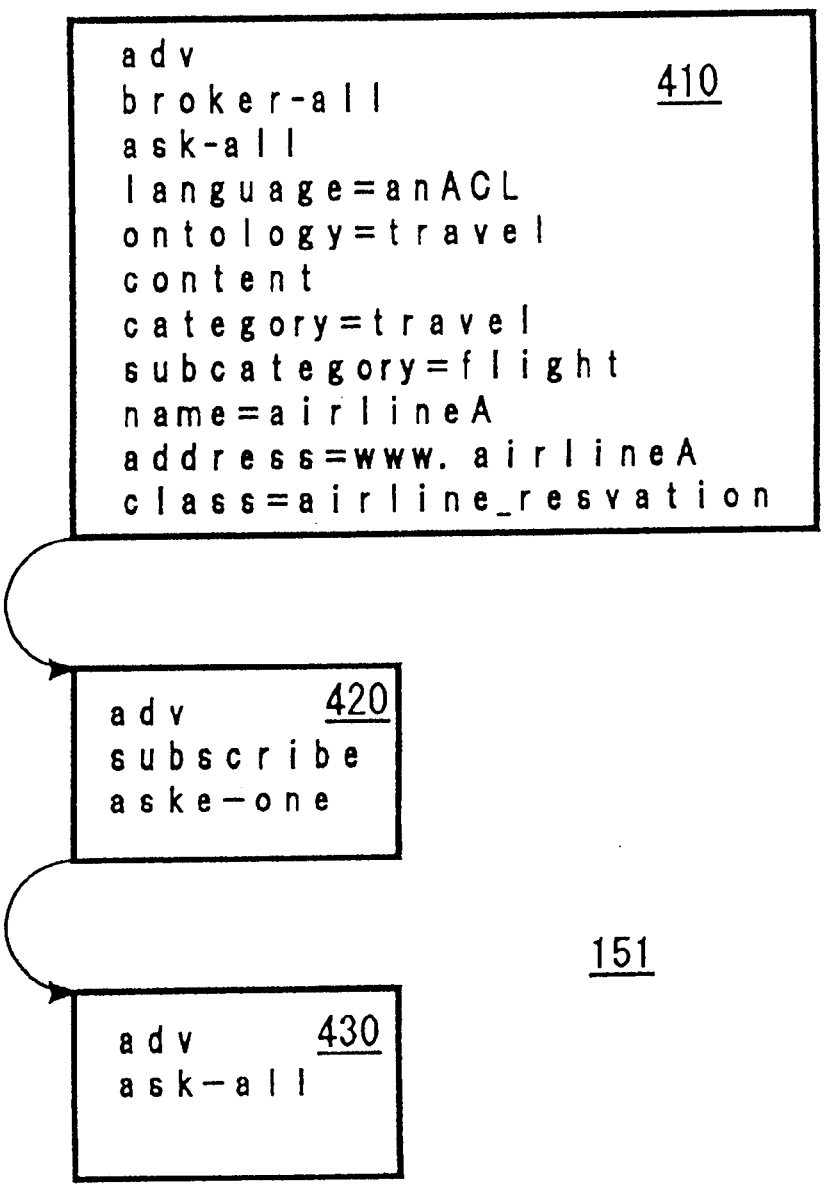

[Figure 6]
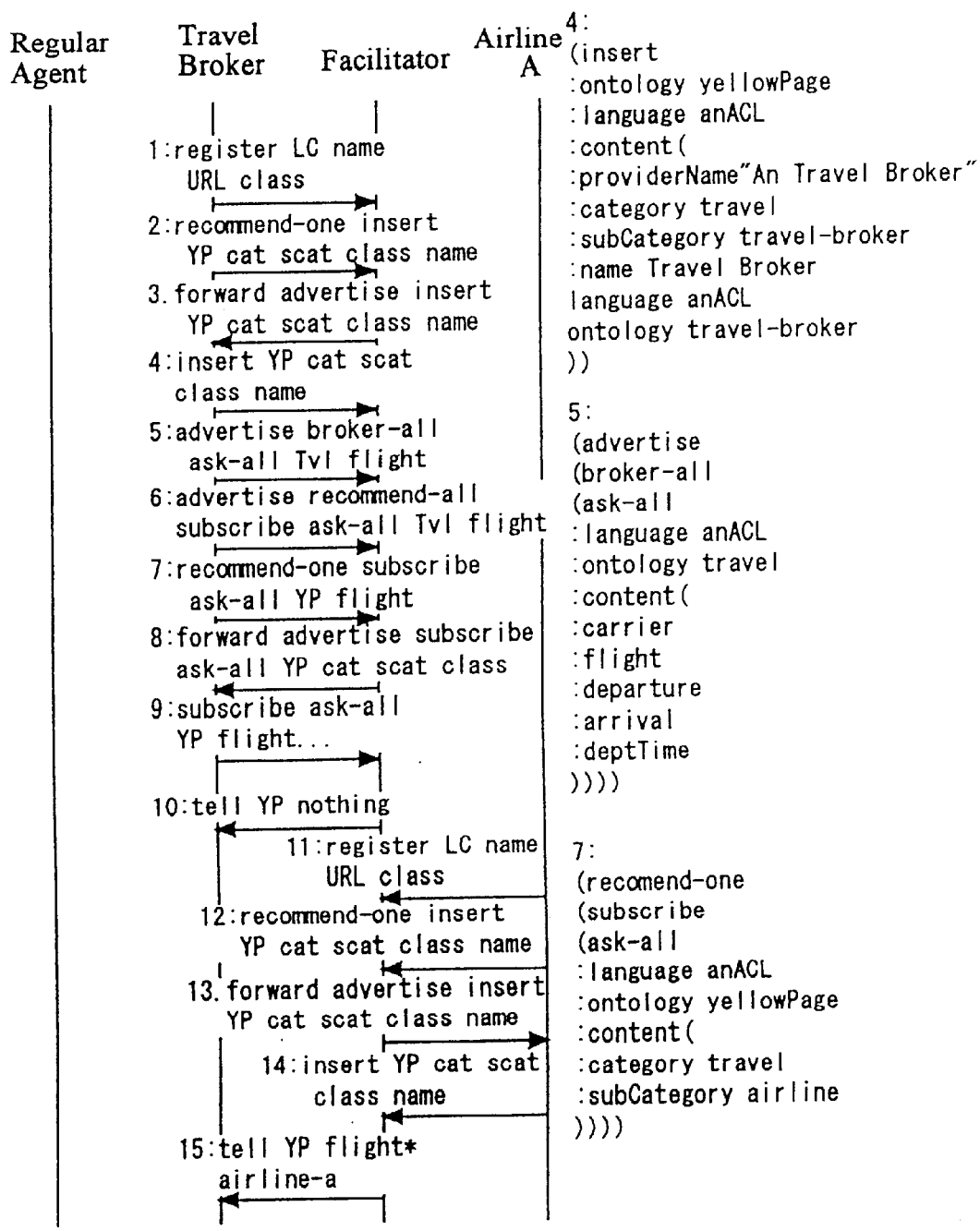

[Figure 7]
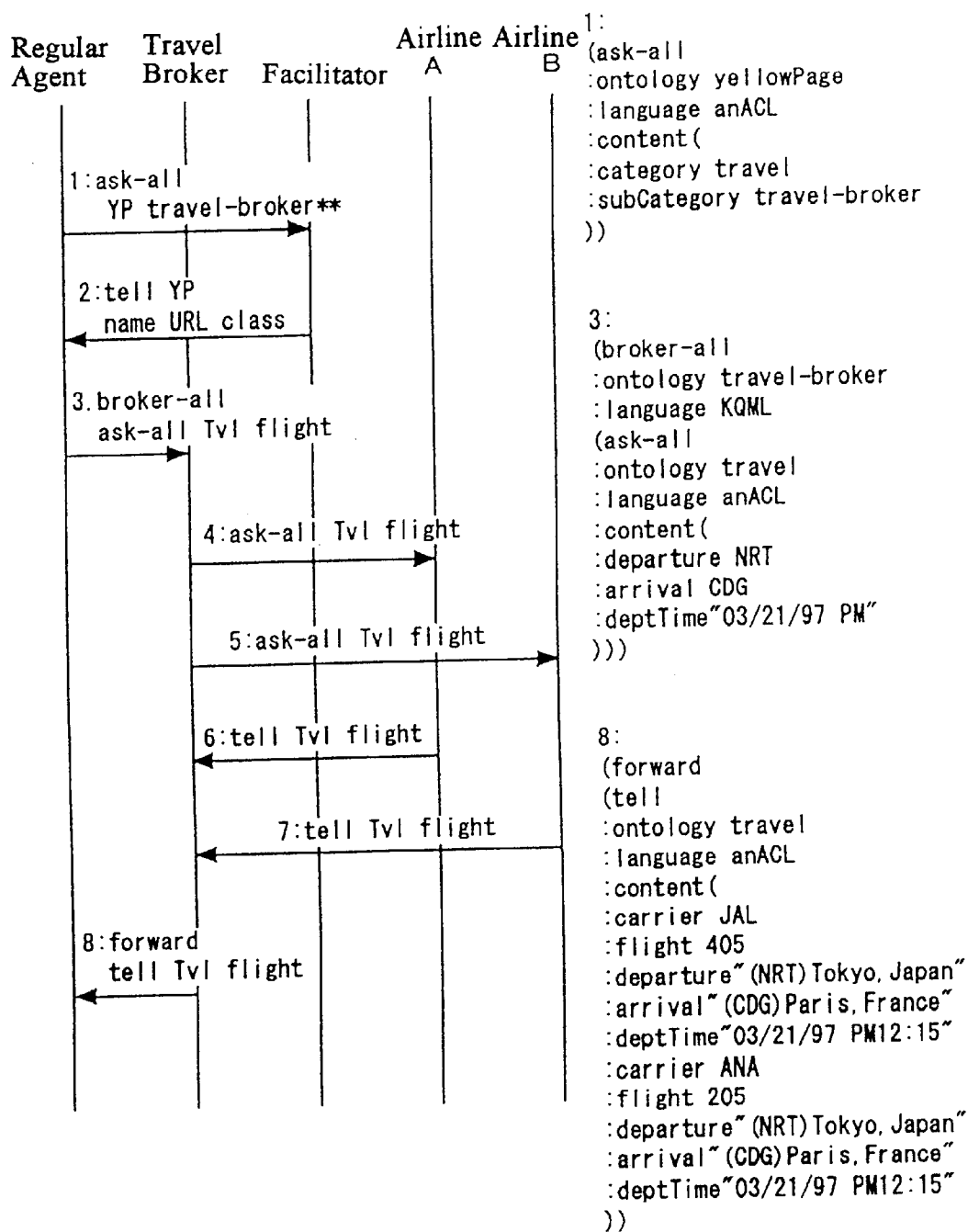

[Figure 8]
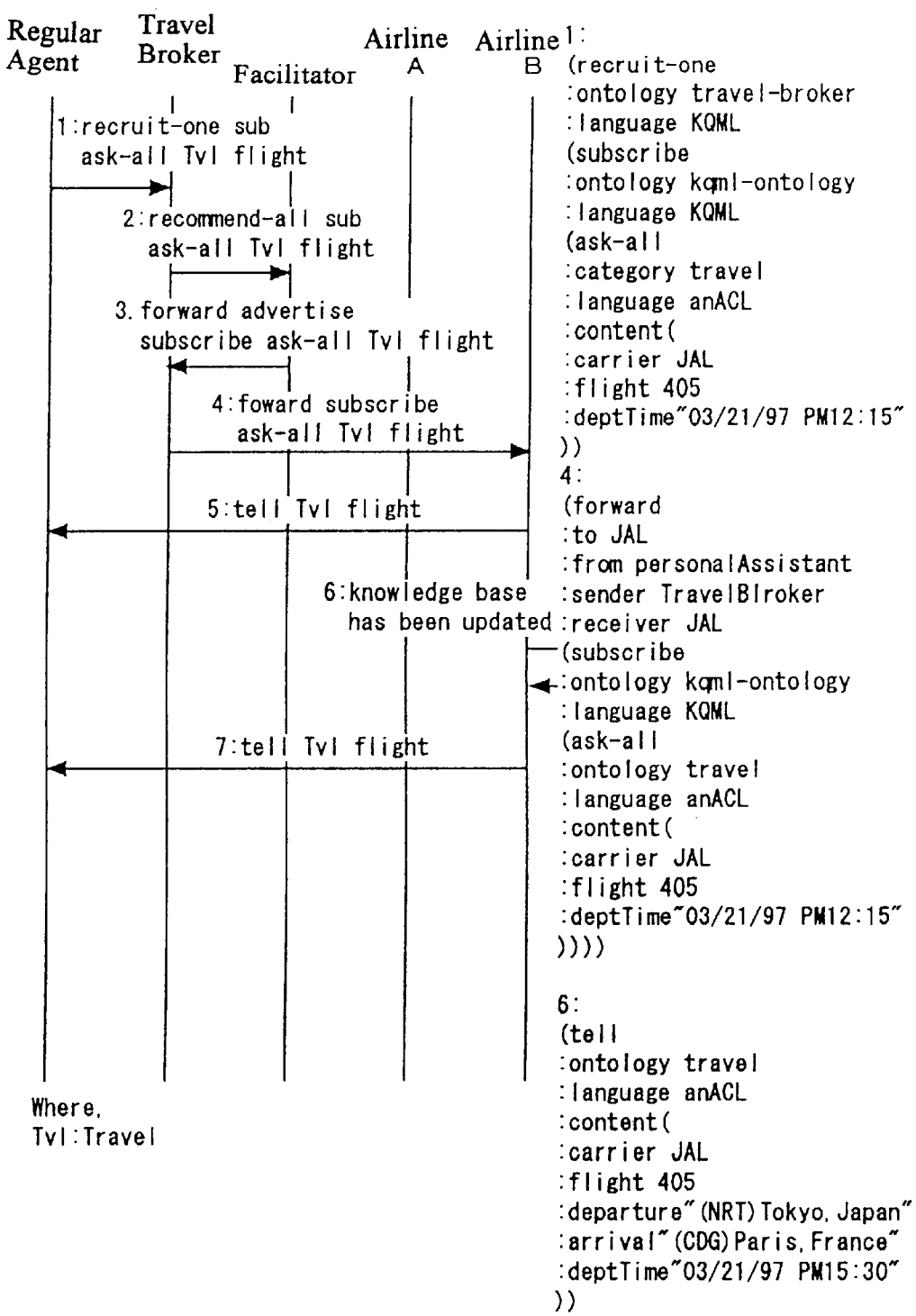

[Figure 9]
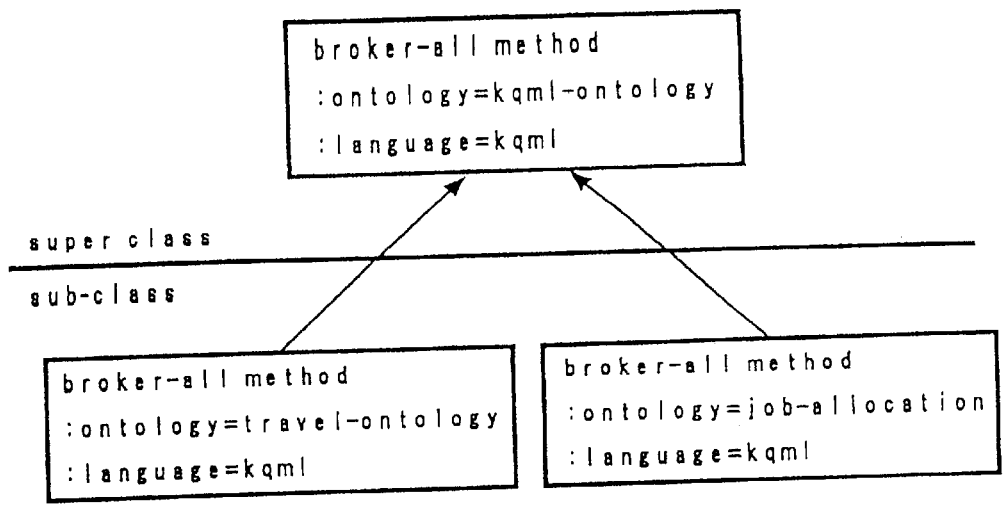
[Figure 10]
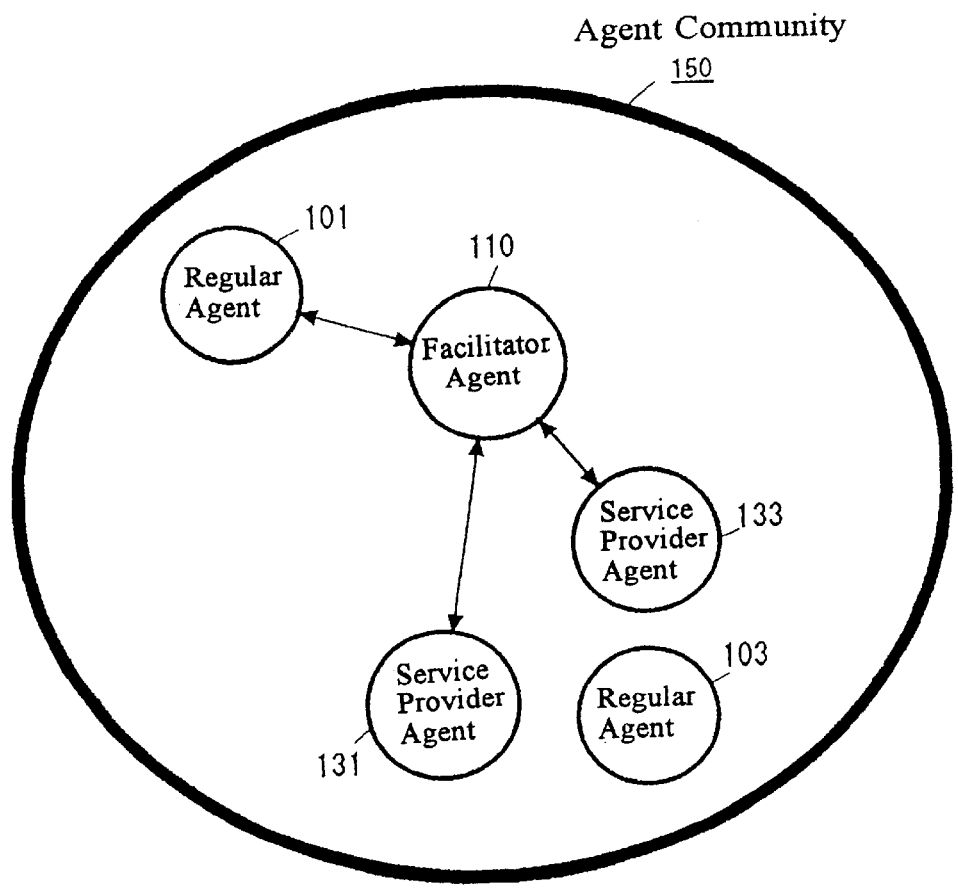

MESSAGE HANDLING METHOD, MESSAGE HANDLING APPARATUS, AND MEMORY MEDIA FOR STORING A MESSAGE HANDLING APPARATUS CONTROLLING PROGRAM

TECHNICAL FIELD OF THE INVENTION

This invention relates to a data processing technique, and more particularly, to an improved data processing method for supporting communications among two or more nodes on a network in a distributed computer environment.

BACKGROUND OF THE INVENTION

There is a mobile agent technology in the art in which an internal condition is moved as it is to a place which is provided in a server existing on a network in a distributed computer environment to form an instruction in the place where it moved to. Reference is made to U.S. Pat. No. 5,603,031(PUPA 7-182174) and Fumihiko Nishida, Susumu Fujiwara et al's "Latest Internet Technology, special edition of Nikkei Communication", pp 104–117, Nikkei BP.

Such mobile agent makes a contact to other agents in the moved-to place (a mobile agent or a resident agent) and may be served as appropriate. A place is a location provided by a server existing on the network to which the agent moved and which supports a contact among agents and absorbs the differences between the hardware and between the platforms.

The mobile agent technology enables a mobile agent to act as a proxy of a human being in handling jobs such as dynamically adjusting a schedule of internal meetings in compliance with the schedule of attendees and status of reservation of conference rooms and acquiring desired information distributed on the network.

In a prior art system (part of FIG. 10) which makes a contact between agents, a mobile agent 101 or a resident agent 103 (in general, an agent which requests a service is called a regular agent hereinafter), in requesting a service to service provider agents 131,133 which have an ability to provide a service, inquires of a facilitator agent 110 which maintains an agent community 150 residing in that place to find service provider agents 131,133 which have an ability of providing a service, and makes a contact to the service provider agents 131,133 based on the information obtained from the inquiry.

However, because a service provider agent residing in community 150 was registered in and maintained by the facilitator agent 110 in a form unique to each service provider agent, regular agents 101, 103 which desired to receive a service had to find service provider agents 131,133 having an ability to provide its own service from a list of agents which was received from the facilitator agent 110.

Also, the regular agents 101,103 had to inquire for each service provider that corresponds to respective service provider agents 131,133 from which the service is received.

Further, the regular agents 101,103 had to control themselves even in a stereotype processing and check the content and combination of requests depending on what request was directed to what service provider.

The regular agent had to build a desired process result based on the process result they received from each service provider.

Furthermore, it was necessary to expand functions of the facilitator agent 110, and maintain the facilitator agent 110 itself when attempting expansion of the service and halting the service in installation.

It is an object of this invention to provide a communication system which is capable of dealing with inquiries from agents flexibly, suitably and at high speed.

It is another object of this invention to provide a communication system which reduces the amount of load born by users of agents.

It is a further object of this invention to provide a communication system which absorbs the difference between service provider agents.

It is still another object of this invention to provide a communication system which enables a desired process result to be built based on a plurality of different process results received from each service provider agent.

It is still a further object of this invention to provide a communication system which enables a high speed operation by distributing tasks.

It is a further object of this invention to provide a communication system which is highly expandable by dynamically installing various agents.

It is still a further object of this invention to reduce the work and the time required for developing and maintaining a program as much as possible in providing support to communication among agents.

It is a further object of this invention to provide a communication system which is capable of flexibly dealing with conversations among agents.

It is another object of this invention to provide a message processing system which gives less load to a communication network.

SUMMARY OF THE INVENTION

In this invention, a plurality of different broker agents such as 121,123 (see FIG. 1) are provided which are customized to problem areas for processing, such as distributing and integrating tasks which are the requests from regular agents. The broker agents 121,123 inquire of the facilitator agent 110, receive a list of service provider agents 131,133 which are relevant to their own jobs, and retain the list. The broker agent 121 which receives a message packet requesting a mediation of a job from the regular agent 101 determines the outline of the requested job by analyzing the message packet and sends it to a service provider agent which retains it as a list after certain conversion. The broker agent 121 receives a reply from the service provider agents 131,133 and transmits it to the regular agent 101 after certain conversion.

According to one aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;

(a) receiving a message packet sent from a regular agent, (b) determining whether or not said received message packet conforms to a predetermined format, (c) inquiring said facilitator agent to determine whether or not a service provider agent having a predetermined service provider classification information is available, (d) converting said received message packet, and (e) sending said converted message packet to the available service provider agent.

As used in the claims of this patent specification, "converting a message packet" shall mean a concept which includes, beside replacing a part of data of a message packet (e.g., message type or ontology, in the preferred embodiment of this invention) with other data, extracting a part of data of a message packet (such as content in the preferred embodiment of this invention) and adding data to a message packet (including forward processing to generate a message packet which has a message packet in the preferred embodiment of this invention as a content).

As used in the claims of this patent specification, "sending a message packet to a service provider agent" shall mean a concept which includes, for instance, not only sending from a sender directly to a service provider agent but also indirectly sending by utilizing other resources including a facilitator agent.

As used in the claims of this patent specification, "service provider agent specifying information" shall mean all information which enables access to a service provider agent and includes an agent name, object class name and address name as well as a combination thereof.

As used in the claims of this patent specification, "service provider agent classification information" shall mean all information which specifies the class of services provided by a service provider agent, and is a concept including all information which identify an interpreter, a translator, a conversation check routine, a format check routine, an interpretation execution routine and an execution routine that are held by a service provider agent. In the preferred embodiment of this invention, this is a concept which corresponds to an ontology information, a category information, a subcategory information, a message type information and a describing language information as well as a combination thereof.

According to another aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;
 (a) receiving a message packet sent from a regular agent,
 (b) inquiring said facilitator agent to determine whether or not a service provider agent having a predetermined service provider classification information is available, and
 (c) sending a data which contains the content of said message packet to the available service provider agent.

According to still another aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;
 (a) receiving a message packet sent from a regular agent, and
 (b) instructing a service provider agent which has a predetermined service provider agent classification information to send data including the content of said message packet to said facilitator agent.

According to a further aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;
 (a) receiving a message packet sent from a regular agent,
 (b) determining whether or not said received message packet conforms to a predetermined format,
 (c) inquiring said facilitator agent to inspect whether or not a service provider agent having a predetermined service provider classification information is available,
 (d) converting said received message packet so as to correspond to said available service provider agent, and
 (e) sending said converted message packet to said available service provider agent.

According to a still further aspect of this invention, a message processing method is provided for execution by an agent community which includes a regular agent for sending a message packet to request to process said message packet, a plurality of service provider agents for processing said message packet and a broker agent which retains a broker advertise table for maintaining a service provider agent specifying information that specifies a service provider agent having a predetermined service provider agent classification information, said method comprising the steps of;
 (a) receiving a message packet sent from a regular agent,
 (b) determining whether or not a service provider agent having a predetermined service provider agent classification information is available with reference to the broker advertise table, and
 (c) sending the content of said message packet to said available service provider agent.

According to a further aspect of this invention, a message processing method is provided for execution by an agent community which includes a regular agent for sending a message packet to request to process said message packet, a plurality of service provider agents for processing said message packet and a broker agent which retains a broker advertise table for maintaining a service provider agent specifying information that specifies a service provider agent having a predetermined service provider agent classification information, said method comprising the steps of;
 (a) receiving a message packet sent from a regular agent,
 (b) determining whether or not a service provider agent having a predetermined service provider agent classification information is available with reference to the broker advertise table,
 (c) sending the content of said message packet to said available service provider agent,
 (d) receiving a response message packet from said available service provider agent, and
 (e) converting said received response message packet.

According to a further aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;
 (a) receiving a message packet sent from a regular agent,
 (b) analyzing said received message packet to determine the service provider agent classification information, (c) specifying a service provider agent which corresponds to the determined service provider agent classification information, (d) converting said received message packet, and (e) sending said converted message packet to the corresponding service provider agent.

According to still further aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;

(a) receiving a message packet sent from a regular agent, (b) analyzing said received message packet to determine the service provider agent classification information, (c) specifying a service provider agent which corresponds to the determined service provider agent classification information, (d) converting said received message packet, (e) sending said converted message packet to the corresponding service provider agent, (f) receiving a response message packet from said corresponding service provider agent, and (g) converting said received response message packet.

According to still further aspect of this invention, a message processing method is provided for execution by an agent community which includes a regular agent for sending a message packet to request to process said message packet, a plurality of service provider agents for processing said message packet and a facilitator agent for maintaining a service provider agent specifying information and a service provider agent classification information, said method comprising the steps of;

(a) receiving a response message packet from said plurality of service provider agents, said response message packet being a process result of a message packet sent from a regular agent, (b) converting said received message packet, and (c) sending said converted message packet to said regular agent.

According to still further aspect of this invention, a community system is provided which processes a message packet sent from a regular agent, said system comprising;

(a) a plurality of service provider agents for processing message packets, (b) a facilitator agent for maintaining the service provider agent specifying information and the service provider agent classification information, and (c) a broker agent for;
(c-1) receiving a message packet sent from said regular agent,
(c-2) determining whether or not said received message packet conforms to a predetermined format,
(c-3) inquiring said facilitator agent to determine whether or not a service provider agent having a predetermined service provider agent classification information is available,
(c-4) converting said received message packet, and
(c-5) sending said converted message packet to said available service provider agent.

According to still further aspect of this invention, a community system is provided which controls a plurality of service provider agents for processing a message packet sent from a regular agent, said system comprising;

(a) a facilitator agent for maintaining the service provider agent specifying information and the service provider agent classification information, and (b) a broker agent for;
(b-1) receiving a message packet sent from said regular agent,
(b-2) inquiring said facilitator agent to determine whether or not a service provide agent having a predetermined service provider agent classification information is available, and
(b-3) sending data including the content of said message packet to said available service provider agent.

According to still further aspect of this invention, a community system is provided which processes a message packet sent from a regular agent, said system comprising;

(a) a plurality of service provider agents for processing message packets, (b) a facilitator agent for maintaining the service provider agent specifying information and the service provider agent classification information, and (c) a broker agent for;
(c-1) receiving a message packet sent from said regular agent, and
(c-2) instructing said facilitator agent to send data including the content of said message packet to a service provider agent having a predetermined service provider agent classification information.

According to one of the aspects of this invention, an agent community system is provided, said system comprising;

a broker agent for;
(a) receiving a message packet sent from a regular agent,
(b) retaining a broker advertise table for maintaining a service provider agent specifying information which specifies a service provider agent having a predetermined service provider agent information, among a plurality of service provider agents which process said message packets,
(c) determining whether or not a service provider agent having a predetermined service provider agent classification information is available with reference to said broker advertise table, and
(d) sending data including the content of said message packet to said available service provider agent.

According to a further aspect of this invention, an agent community system is provided, said system comprising;

(a) a regular agent for sending a message packet and requesting to process said message packet, (b) a plurality of service provider agents for processing said message packet, (c) a facilitator agent for maintaining a service provider specifying information and a service provider classification information, (d) a broker agent for;
(d-1) receiving a response message packet from said plurality of service provider agents, said response message packet being a process result of a message packet sent from said regular agent,
(d-2) converting said received message packet,
(d-3) sending said converted response message packet to said regular agent.

According to a further aspect of this invention, an agent community system is provided which includes a regular agent for sending a message packet to request to process said message packet, a plurality of service provider agents for processing said message packet, and a facilitator agent for maintaining a service provider specifying information and a service provider classification information, said system comprising;

(a) means for receiving a message packet sent from a regular agent, (b) means for inquiring said facilitator agent to determine whether or not a service provider agent having a predetermined service provider agent classification information is available, and (c) means for sending data including the content of said message packet to said available service provider agent.

According to a further aspect of this invention, an agent community system is provided which includes a regular agent for sending a message packet to request to process said message packet, a plurality of service provider agents for processing said message packet, and a facilitator agent for maintaining a service provider specifying information and a service provider classification information, said system comprising;

(a) means for receiving a message packet sent from a regular agent, and (b) means for instructing said facilitator agent to send data including the content of said message packet to a service provider agent which has a predetermined service provider agent classification information.

According to a further aspect of this invention, a message processor comprising an agent community system is provided which includes a regular agent for sending a message packet to request to process said message packet, a plurality of service provider agents for processing said message packet, and a broker agent retaining a broker advertise table which maintains a service provider agent specifying information that specifies a service provider agent having a predetermined service provider agent classification information, said system comprising;

(a) means for receiving a message packet sent from a regular agent, (b) means for determining whether or not a service provider agent having a predetermined service provider agent classification information is available with reference to said broker advertise table, and (c) means for sending data including the content of said message packet to said available service provider agent.

According to a further aspect of this invention, a message processor comprising an agent community is provided which comprises a regular agent for sending a message packet to request to process said message packet, a plurality of service provider agents for processing said message packet and a facilitator agent for maintaining a service provider agent specifying information and a service provider agent classification information, said processor comprising;

(a) means for receiving a message packet sent from said regular agents, (b) means for analyzing said received message packet to determine service provider agent classification information, (c) means for specifying a service provider agent corresponding to said determined service provider agent classification information, (d) means for converting said received message packet, and (e) means for sending said converted message packet to said corresponding service provider agent.

According to a further aspect of this invention, a message processor comprising an agent community is provided which comprise a regular agent for sending a message packet and requesting to process said message packet, a plurality of service provider agents for processing said message packet and a facilitator agent for maintaining a service provider agent specifying information and a service provider agent classification information, said processor comprising;

(a) means for receiving a response message packet from said plurality of service provider agents, said response message packet being a process result of a message packet sent from a regular agent, (b) means for converting said received response message packet, and (c) means for sending said converted response message packet to said regular agent.

According to still further aspect of this invention, a recording media is provided which stores therein a message processing program for execution by a message processor comprising a regular agent for sending a message packet to request to process said message packet, a plurality of service provider agents for processing said message packet and a facilitator agent for maintaining a service provider agent specifying information and a service provider agent classification information, said program comprising;

(a) a program code for instructing said message processor to receive a message packet sent from a regular agent, (b) a program code for instructing said message processor to inquire said facilitator agent to determine whether or not a service provider agent having a predetermined service provider agent classification information is available, and (c) a program code for instructing said message processor to send data including the content of said message packet to said available service provider agent.

According to still further aspect of this invention, a recording media is provided which stores therein a message processing program for execution by a message processor comprising a regular agent for sending a message packet to request to process said message packet, a plurality of service provider agents for processing said message packet and a facilitator agent for maintaining a service provider agent specifying information and a service provider agent classification information, said program comprising;

(a) a program code for instructing said message processor to receive a message packet sent from a regular agent, and (b) a program code for instructing said message processor to send data including the content of said message packet to a service provider agent having a predetermined service provider agent classification information.

According to still further aspect of this invention, a recording media is provided which stores therein a message processing program for execution by a message processor comprising a regular agent for sending a message packet to request to process said message packet, a plurality of service provider agents for processing said message packet and a broker agent retaining broker advertise table which maintains a service provider agent specifying information that specifies a service provider agent having a predetermined service provider agent classification information, said program comprising;

(a) a program code for instructing said message processor to receive a message packet sent from a regular agent, (b) a program code for instructing said message processor to determine whether or not a service provider agent having a predetermined service provider agent classification information is available with reference to said broker advertise table, and (c) a program code for instructing said message processor to send data including the content of said message packet to said available service provider agent.

According to still further aspect of this invention, a recording media is provided which stores therein a message processing program for execution by a message processor comprising a regular agent for sending a message packet and requesting to process said message packet, a plurality of service provider agents for processing said message packet and a facilitator agent for maintaining a service provider agent specifying information and a service provider agent classification information, said program comprising;

(a) a program code for instructing said message processor to receive a message packet sent from a regular agent, and (b) a program code for instructing said message processor to analyze said received message packet to determine the service provider agent classification information, (c) a program code for instructing said message processor to specify a service provider agent corresponding to said determined service provider agent classification information, (d) a program code for instructing said message processor to convert said received message packet, and (e) a program code for instructing said message processor to send said converted message packet to said corresponding service provider agent.

According to still further aspect of this invention, a recording media is provided which stores therein a message processing program for execution by a message processor comprising a regular agent for sending a message packet and requesting to process said message packet, a plurality of service provider agents for processing said message packet and a facilitator agent for maintaining a service provider agent specifying information and a service provider agent classification information, said program comprising;

(a) a program code for instructing said message processor to receive a response message packet sent from said plurality of service provider agents, said response message packet being a process result of a message packet sent from a regular agent, (b) a program code for instructing said message processor to convert said received response message packet, and (c) a program code for instructing said message processor to send said converted response message packet to said regular agent.

According to still further aspect of this invention, a recording media is provided which retains a broker advertise table for maintaining a service provider agent specifying information which specifies a service provider agent having a predetermined service provider agent classification information among a plurality of service provider agents which process message packets sent from regular agents.

According to still further aspect of this invention, a recording media is provided which includes a broker agent for;

(a) receiving a message packet sent from a regular agent, (b) retaining a broker advertise table to maintain a service provider agent specifying information which specifies a service provider agent having a predetermined service provider agent classification information among a plurality of service provider agents which process message packets, (c) determining whether or not a service provider agent having a predetermined service provider agent classification information is available with reference to said broker advertise table, and (d) sending data including the content of said message packet to said available service provider agent.

BRIEF DESCRIPTION OF DRAWINGS

FIG. 1 schematically shows an agent community where the agent of this invention operates.

FIG. 2 is a block diagram showing one embodiment of the hardware configuration of one node on a distributed network which comprises the agent community of this invention.

FIG. 3 schematically shows an example of a message packet of this invention.

FIG. 4 is a schematic diagram showing an operational condition of each agent in a preferred embodiment of this invention.

FIG. 5 is a schematic diagram of a facilitator advertise table 151 and a broker advertise table 141 in a preferred embodiment of this invention.

FIG. 6 is an object interaction diagram among the components in a preferred embodiment of this invention.

FIG. 7 is an object interaction diagram among the components in a preferred embodiment of this invention.

FIG. 8 is an object interaction diagram among the components in a preferred embodiment of this invention.

FIG. 9 is a schematic diagram of a structure of the broker agent in a preferred embodiment of this invention.

FIG. 10 is a schematic diagram of the agent community in the prior art.

DETAILED DESCRIPTION

The embodiment of this invention will now be described with reference to the drawings. With reference to FIG. 1, an agent community 150 is shown in which the agents of this invention operate. A plurality of mobile agents and resident agents exist in the agent community. Usually, the agent community is a network which consists of a plurality of PC's.

Regular agents 101,103 are mobile agents sent to the agent community 150 or resident agents resident in the agent community. The regular agent 101 is capable of conversing with other agents by sending out and receiving message packets described later.

A facilitator agent 110 is an agent which maintains the state of being alive or dead of a software agent (hereinafter simply called agent) within the agent community and provides a list of agents existing in the agent community.

A travel broker agent 121 is an agent which conducts various mediation relating to an ontology "travel". An "ontology" is a background concept and vocabulary and includes all information to form a decision result and reduce a decision process in determining the content of transmitted information.

Taking an ontology of traffic reservation for example, an interpretation execution part like an interpreter receives a content "R, flight, Narita to Tacoma, 1997/07/06/ 15:00–1997/07/06/18:00", checks for a predetermined format, executes a specific content interpretation routine, interpreting that "R" is a command which instructs to make a reservation, gets access to a database in a given airline to execute a specific execution routine for checking the reservation status. Finally, a reservation is made for a non-smoking seat, economy, FlightXX26 for Tacoma, Seattle, departing Narita airport at 17:10 on Jul. 6, 1997 and the reservation is confirmed to the sender.

FIG. 2 schematically shows a hardware configuration at one of the nodes on a distributed network for forming an agent community existing on a distributed network environment shown in FIG. 1. Each node system 100 includes a central processing unit (CPU) 1 and a memory 4. The CPU 1 and the memory 4 are connected to a hard disk drive 13 acting as an auxiliary storage via a bus 2. Storage media drives such as a floppy disk drive 20, hard disk drive 13,30, CD-ROM drive 26,29, and MO drive 28 are connected to the bus 2 through controllers including a floppy disk controller 19, an IDE controller 25 and an SCSI controller 27.

A portable storage media such as a floppy disk is inserted to the storage media drive such as the floppy disk drive 20. Such floppy disk and other storage media of the hard disk drive 13 and the ROM 14 may have recorded therein a computer program which provides instructions to the CPU in cooperation with an operating system to practice this invention, with the program being loaded into the memory 4. The computer software may be compressed or divided into multiple pieces for storage in multiple media.

The node system 100 may be a system which has user interface hardware, such as a pointing device (a mouse or a joy stick, etc.) 7 or a keyboard 6 for input and a display 12 for presenting visual data to a user. A parallel port 16 may be provided for connecting a printer. The node system 100 may have a modem connected thereto via a serial port 15 for connection to the network through the serial port 15 and the modem or through a token ring or a communication adapter 18 to communicate with other computer systems.

It will be readily understood that this invention may be implemented in a conventional personal computer (PC), a workstation, a general purpose computer or a combination of them. It should be noted however that these components are chosen as exemplary components and not all components are necessarily an indispensable component of the invention. Specifically, it is not necessary to install a user interface in the server side because the server can be remote-controlled so that it is enough to have a basic data processing function such as a CPU and a memory, and a communication function.

The operating system in the node system 100 may be implemented by one which supports on a standard basis a GUI (graphical user interface) multi-windows environment such as WindowsNT(trademark of Microsoft), Windows95 (trademark of Microsoft), Windows3.x(trademark of Microsoft), OS/2(registered trademark of IBM), X-Window system(trademark of MIT) on AIX(registered trademark of IBM), and Solaris(trademark of Sun Microsystems), as well as one which is for a character-based environment such as PC-DOS (trademark of IBM) and MS-DOS(trademark of Microsoft), and a real time OS such as OS/Open(trademark of IBM) and VxWorks(trademark of Wind River Systems, Inc.) without being limited to any specific operating system environment.

Now, with reference to FIG. 3 and FIG. 4, the operation of each agent in the preferred embodiment of this invention is described.

FIG. 3 schematically shows a message packet used in the preferred embodiment of this invention.

In the preferred embodiment of this invention, a performative of an agent communication language (ACL) is used in the message type 301 contained in the message packet of FIG. 3. ACL is a high level language which provides a communication among agents in a form that is close to human language.

Included in these agent communication languages are ACL provided by FIPA(Foundation for Intelligent Physical Agents), KQML(Knowledge Query Manipulation Language), and KIF(Knowledge Interchange Format). KQML is laid open by "SEMANTICS FOR AN AGENT COMMUNICATION LANGUAGE, Yannis Labrou, A Doctoral Dissertation for the PhD Defense Examination, Submitted to Defense Committee, at the Computer Science and Electrical Engineering Department (CSEE), University of Maryland Graduate School" and "TR CS-97-03, A Proposal for a new KQML Specification, Yannis Labrou and Tim Finin Feb. 3, 1997".

Included in the performatives of KQML which is one of ACL are;

ask-if, ask-all, stream-all, eos, tell, untell, deny, insert, uninsert, delete-one, delete-all, undelete, achieve, unachieve, advertise, unadvertise, subscribe, error, sorry, standby, ready, next, rest, discard, register, unregister, forward, broadcast, transport-address, broker-one, broker-all, recommend-one, recommend-all, recruit-one, recruit-all.

A sender 303 is a sender of a message while a receiver 305 is a receiver of a message.

A response ID 307 is an ID which refers to a preceding conversation. When an agent has a conversation with a plurality of parties, a plurality of conversation ID's are allocated corresponding to the conversation threads which will be described later.

A conversation ID 309 is an ID which tells the conversation partner to respond with this ID.

The describing language type 311 is information which specifies the language describing the content. The ontology 313 is information which specifies the ontology that the content specifies. In the preferred embodiment of this invention, a ticket purchase ontology, a numerical calculation ontology and a yellow page ontology, etc., are provided.

The content 315 is the particular content of a message and contains software for forming instructions after it is moved to another place in the preferred embodiment of this invention. The content 315 may also internally contain a message packet for movement to another place via a relaying point. Then a From entry and a To entry are provided to indicate a true sender and a final receiver, respectively, in the preferred embodiment of this invention.

FIG. 4 schematically shows an operational condition in the preferred embodiment of this invention.

In FIG. 4, each service provider agent 131,133,135 reports to the facilitator agent 110 of a capability, the name and address each owns upon installation into the agent community 150 and the reported information is stored in the facilitator advertise table 151.

FIG. 5 schematically shows a facilitator advertise table 151 and a broker advertise table 141. The facilitator advertise table 151 holds message packets sent from agents (service provider agents, broker agents, regular agents, etc.) which are maintained by the facilitator agent 110 as shown in the figure.

Included in each advertise message packet are; a message type 301 such as "broker-all" which the agent can process, a describing language type 311 such as "anACL" which is understandable to the agent, a classification information of the capabilities owned by the agent such as the type of interpreter which the agent has (ontology 313) and the type of service which the agent provides, like "travel", and an agent specifying information including an agent name like "airlineA"; an address information to get access to the agent, like "www.airlineA"; and a class name to start the agent like "airline-reservation".

Other agents existing in the agent community 150 can identify a service provider agent which has a desired capability with reference to the facilitator advertise table 151 to send a request to process.

The travel broker agent 121 extracts a service provider agent involved in the job it provides with reference to the facilitator advertise table 151 to generate a broker advertise table 141 which has a structure similar to the facilitator advertise table 151.

The difference between the facilitator advertise table 151 and the broker advertise table 141 in the preferred embodiment of this invention lies only in that a service provider agent in which a control object coincides a condition including a predetermined category, describing language and ontology is extracted. Because the broker advertise table 141 extracts only a specific classification information (ontology only, category only, message type+-7)subcategory+-7) describing language, etc.) to which the service provider agent holding that table refers so that the broker advertise table only needs to control a minimum of information required to get access to the corresponding service provider agent, it may be controlled as a table which has a different structure from the facilitator advertise table 151.

Further, with a provision of an advertise table which is exactly the same as the facilitator advertise table 151, a service provider agent which meets a predetermined condition may be searched each time a process request is received from a regular agent. In the preferred embodiment of this invention, because the broker agent asks the facilitator agent 110 to forward a process request to a service provider agent having a predetermined condition or to recommend a service provider agent having a predetermined condition each time it receives a process request from a regular agent, it does not retain the broker advertise table 141.

FIG. 6 is an object interaction diagram showing steps of registering a service provider agent in the broker advertise table 141 by accessing to a facilitator agent.

At first (in step 1), the travel broker agent 121 registers "its own name(object name)", "the place it is(URL,etc.)", and "its own class name" in a life cycle control mechanism of the facilitator agent 110.

Next (in step 2), the travel broker agent 121 requests the facilitator agent 110 to introduce (i.e. recommend) an agent (the facilitator agent itself in this case) who registers a category, subcategory, class name and agent name in the facilitator advertise table 151.

The facilitator agent 110 searches a record which was advertised prior to the request and, in finding an agent which matches the condition, generates a message packet (in step 3) having that advertise record as a content for return to the broker agent.

Because the broker agent 121 knows that the answer is the facilitator agent 11 0 itself, it sends a message packet of insert (in step 4) to the facilitator agent 110 for it to enter the information of the broker agent 121 in the database which is held by the facilitator agent 110.

The travel broker agent 121 then advertises its capability (in step 5), i.e., expresses that "can answer that it throws a message in the form of broker-all (ask-all(:ontology=Travel, :content=(flight . . . ))) to itself", and (in step 6) that it can answer "recommend-all subscribe ask-all" messages for travel ontology with flight content.

The travel broker agent 121 tells the facilitator agent 110 (in step 7) "introduce(recommend-one) an agent who can subscribe ask-all to an agent who has information:flight in the content with YellowPage ontology".

Because the travel broker agent 121 knows that the facilitator agent 110 has the capability from the answer returned therefrom (in step 8), it sends to the facilitator agent 110 (in step 9) "subscribe(ask-all(:ontology=YellowPage, :content(:flight . . . )))".

Because there is no advertise record that matches this query presently, the content of the tell answer is nothing (in step 10). For subscribe, one tell is immediately returned to notify the current status of the facilitator advertise table 151.

One service provider agent then arises, registers itself (in step 11) to the facilitator agent 110 and asks for a partner (in step 12) to which it can insert its information.

Since the service provider agent knows that the answer from the facilitator agent 110 (from step 13) is the facilitator agent 110, it inserts (in step 14) its information to the facilitator advertise table 151 of the facilitator agent 110.

Because one service provider arose and the database in the facilitator agent 110 was updated, the facilitator agent 110, in detecting this, scans its own table for an agent who has subscribed to this information. In this example, the broker agent 121 is found and it (i.e. the facilitator agent 110) sends a tell message (in step 15) as a notification to the broker agent 121.

Because the above described service provider agent is adopted in the registering procedure in the preferred embodiment of this invention, introduction of the broker agent and service provider agent can be dynamically dealt with. However, it is to be noted that such a system which can dynamically deal with introduction of the service provider agent and the broker agent is only one aspect of the preferred embodiment of this invention and the broker agent can simply access to the facilitator agent 110 upon introduction or start to extract necessary information or select information after all agent information have been received to establish a status in which necessary information is available to the broker agent.

An operational condition of the broker agent which receives a process request from a regular agent in the preferred embodiment of this invention is next described with reference to the object interaction diagram in FIG. 7 and FIG. 8.

First at step 1, a regular agent 101 asks the facilitator agent 110 for the location of the travel broker agent 121 and receives at step 2 the reply based on the information of the facilitator advertise Next at step 3, the regular agent 101, knowing the location (from step 2) of the travel broker agent 121, sends to the broker agent 121 a request "have all agents whose ontology is Travel and who can answer when asked about a flight information of an airplane take (broker) this job". The language to broker-all at this time is kqml and the :ontology is travel-ontology. Thus a travel interpreter which is one of the interpreters which are held by the travel broker agent 121 will be designated and take over processing.

The travel interpreter of the travel broker agent 121 internally converts the message broker-all at step 3 to recruit-all(meaning hiring an agent) and sends a request at steps 4 & 5 to each service provider agent who represented in advance that capability by an advertise performative.

Each service provider agent returns (in steps 6 and 7) information in response to this. In forward performative (step 8), the originator of the message is described in the:

from keyword in the message packet. In the preferred embodiment of this invention, a reply is omitted if no reply is returned within some given time period.

The travel broker agent 121 converts information from each service provider to a list structure and returns it at step 8 to the regular agent which is a client.

FIG. 8 is an object interaction diagram showing an operational condition of a broker agent which receives a process request from a regular agent in the preferred embodiment of the invention.

In FIG. 8, at step 1, the regular agent 101 first requests the travel broker agent "to hire(recruit-one) an agent whose ontology is Travel and who is capable of answering when asked about a flight information of airplanes, and of being subscribed, and lets it do this job.

The travel broker agent 121, upon receiving this request, queries at step 2 the facilitator agent 110 of whether or not "an agent whose ontology is Travel and who is capable of answering when asked about a flight information of airplanes, and of being subscribed" exists in the community.

The travel broker agent 121, at step 3, when finding the party it sought for, sends at step 4, a subscribe request packed in a forward message to the service provider agent. At this time the message packet is converted and an ontology of the content is set to Travel. The innermost content is processed by an interpreter owned by an airline agent who is a service provider.

The airline agent, upon receiving this, sends the flight information directly to the regular agent 101 at step 5. In addition, it notifies (in step 7) the regular agent 101 of any update (see step 6) of the flight information (such as the time change for JAL flight 405 from 12:15 pm to 15:30 pm, as shown in flows 4 and 6 at the right-hand side of FIG. 8).

In the embodiment so far described, while the broker agent 121 requested a service provider agent of the same class to process, and received and converted the process result (in the second embodiment, the service provider agent returned a reply directly to the regular agent), a manner in which a service provider agent which conducts a different kind of processing is requested to process will be next described, taking a reservation of a conference room for example.

In this example, a message packet contains information such as reservation ontology and roomReservation ontology, etc.

The reservation ontology has keywords including a start time, ending time, and attendees list while the roomReservation ontology is defined as a lower level of ontology of reservation ontology and has keywords including a list of attendees to the conference, the floor where the room is and the room number, etc.

In the preferred embodiment of this invention, a broker which controls the roomReservation ontology has a logic which interprets in the following way.

Logic 1: prepare a message packet like an ask-if message containing a schedule of the attendees between the start time and the ending time and give it to a calendar agent which controls the schedule of each attendee in the attendees list to check the schedule.

Logic 2: prepare an achieve message if the schedule is open and send and lock it (with or without time limit).

Logic 3: prepare a sorry message if the reply from other calendar agents tells "the time frame is not open" and return it to the client.

Logic 4: the broker agent prepares an achieve message again if the client follows with a conversation message which tells to change the time and give it to the calendar agents to unlock each calendar agent.

Logic 5: prepare a message packet like an ask-if message for the availability of conference rooms if the time of all calendar agent is open and give it to a conference room reservation agent to ask. The conference room reservation agent is treated in the same way as other calendar agents and is only asked about available time. This is repeated while the time of all agent is open or is suitably left to an operator's interaction at a client. Alternatively, it is possible to display a table of sum of available time for each agent.

Logic 6: prepare an achieve message packet and send a reservation if the time is open.

Logic 7: prepare a sorry message if the time is not open and return it to the client. In this case, an operator's judgment intervenes. Like the logic 4, the operator of the client will take some other action like changing the request.

An implementation of a broker agent in the preferred embodiment of this invention is now described with reference to FIG. 9. In implementing the broker agent, an agent is provided in which language is kqml and :ontology is kqml-ontology as a default behavior to broker-one, broker-all, recommend-one, recommend-all, recruit-one, recruit-all, etc.

The class which has this default behavior is named kqmlInterpreter class and has, as a method, broker-one, broker-all, recommend-one, recommend-all, recruit-one, recruit-all and ones corresponding to other performatives. The broker agent is formed by subclassing this class and overriding the method to realize processing which is unique to the problem area.

A lower subclass in FIG. 9 first receives a request from the client and conducts a process which is unique to travel-ontology for example. Note that the content is described with kqml in this case. "kqmlInterpreter" class supports:

register, unregister, ask-one, ask-all, tell, insert, delete-one, advertise, unadvertise, recommend-all, recommend-one, sorry, error, subscribe, discard, forward, broker-one, broker-all, recruit-one, recruit-all. They belong to either one of LifeCycle ontology, YellowPage ontology and kqml ontology. In subclassing, an appropriate class will be subclassed.

ADVANTAGE OF THE INVENTION

As described above, this invention provides a communication system which is capable of flexibly and promptly dealing with a query from an agent.

In another aspect of this invention, a communication system is provided which reduces the amount of load born by users of agents.

In a further aspect of this invention, a communication system is provided which absorbs the difference between service provider agents.

In still another aspect of this invention, a communication system is provided which enables a desired process result to be built based on a plurality of different process results received from each service provider agent.

In still further aspect of this invention, a communication system is provided which enables a high speed operation by distributing tasks.

In a further aspect of this invention, a communication system is provided which is highly expandable by dynamically installing various agents.

In still further aspect of this invention, the work and the time required for developing and maintaining a program are reduced as much as possible in providing a support to communication among agents.

In a further aspect of this invention, a communication system is provided which is capable of flexibly dealing with conversations among agents.

In another aspect of this invention, a message processing system is provided which gives less load to a communication network.

What is claimed:

1. A message processing method for execution by an agent community which includes a regular agent for sending a message packet to request processing of said message packet, a plurality of service provider agents for processing said message packet and a facilitator agent for maintaining service provider agent access information and service provider agent classification information, said method comprising the steps of:

(a) receiving, by a broker agent which mediates a job for one or more regular agents, a message packet sent from a particular regular agent:

(b) inquiring of said facilitator agent, by said broker agent, to determine whether or not a service provider agent having a predetermined service provider classification information available; and (c) sending, by said broker agent, a message which contains a content of said message packet to the determined available service provider agent.

2. A message processing method for execution by an agent community which includes a regular agent for sending a message packet and a request to process said message packet, a plurality of service provider agents for processing said message packet and a facilitator agent for maintaining service provider agent access information and service provider agent classification information, said method comprising the steps of:

(a) receiving, by a broker agent which mediates a job for one or more regular agents, a message packet sent from a particular regular agent;

(b) determining, by said broker agent, whether or not said received message packet conforms to a predetermined format;

(c) inquiring of said facilitator agent, by said broker agent, to determine whether or not a service provider agent having a predetermined service provider classification information is available;

(d) converting, by said broker agent, said received message packet so as to correspond to said available service provider agent; and (e) sending, by said broker agent, said converted message packet to said determined available service provider agent.

3. A message processing method for execution by an agent community which includes a regular agent for sending a message packet to request processing of said message packet, a plurality of service provider agents for processing said message packet and a broker agent which mediates a job for one or more regular agents and which retains a broker advertise table for maintaining service provider agent access information that specifies a service provider agent having a predetermined service provider agent classification information, said method comprising the steps of:

(a) receiving, by said broker agent, a message packet sent from a particular regular agent, wherein said sent message packet includes a particular service provider agent classification;

(b) determining, by said broker agent, whether or not a service provider agent having said particular service provider agent classification is available by consulting the broker advertise table; and (c) sending a content of said message packet to said determined available service provider agent.

4. The message processing method according to claim 3, further comprising the step of dynamically updating said broker advertise table so that said broker agent is automatically aware of additional service provider agents having said particular service provider agent classification.

5. The message processing method according to claim 4, wherein the step of dynamically updating further comprises the steps of:

sending, by the broker agent, a subscribe request to a facilitator agent with which service provider agents register their service provider agent access information and classification information, wherein said subscribe request notifies said facilitator agent to automatically tell said broker agent of any additional service provider agents that register and which register their service provider agent classification information as being said predetermined service provider agent classification information; and automatically sending a notification, by the facilitator agent, to tell said broker agent when an additional service provider agent registers its service provider agent classification information as being said predetermined service provider agent classification information, wherein said automatically sent notification further comprises said additional service provider agent's access information.

6. The message processing method according to claim 3, further comprising the step of statically updating said broker advertise table, further comprising the steps of:

requesting, by said broker agent, a facilitator agent with which service provider agents register their service provider agent access information and classification information to tell said broker agent of any registered service provider agents which registered their service provider agent classification information as being said predetermined service provider agent classification information; and sending service provider agent access information to said broker agent, by said facilitator agent, for each registered service provider agent which registered said predetermined service provider agent classification information.

7. A message processing method for execution by an agent community which includes a regular agent for sending a message packet to request processing of said message packet, a plurality of service provider agents for processing said message packet and a broker agent which a job for one or more regular agents and which retains a broker advertise table for maintaining service provider agent access information that specifies a service provider agent having a predetermined service provider agent classification information, said method comprising the steps of;

(a) receiving, by said broker agent, a message packet sent from a particular regular agent, wherein said sent message packet includes a particular service provider agent classification;

(b) determining, by said broker agent, whether or not a service provider agent having said particular service provider agent classification is available by consulting the broker advertise table;

(c) sending, by said broker agent, a content of said message packet to said determined available service provider agent;

(d) receiving, by said broker agent, a response message packet from said determined available service provider agent; and (e) converting, by said broker agent, said received response message packet for forwarding to said particular regular agent.

8. The method as claimed in claim 7, wherein:
said determining step determines a plurality of available service provider agents;
said sending step sends said message packet content to said plurality of available service provider agents;
said receiving a response message packet step receives said response message packet from each of said plurality of service provider agents, each of said response message packets being a processing result of processing said sent message packet; and
said converting step converts said plurality of received message packets into a combined list;
and further comprising the step of sending said combined list in a single response message to said particular regular agent.

9. A message processing method for execution by an agent community which includes a regular agent for sending a message packet to request processing of said message packet, a plurality of service provider agents for processing said message packet and a facilitator agent for maintaining service provider agent access information and service provider agent classification information, said method comprising the steps of;
(a) receiving, by a broker agent which mediates a job for one or more regular agents, a message packet sent from a particular regular agent;
(b) analyzing said received message packet, by said broker agent, to determine the service provider agent classification information contained therein;
(c) locating, by said broker agent, a service provider agent which corresponds to the determined service provider agent classification information;
(d) converting, by said broker agent, said received message packet; and
(e) sending, by said broker agent, said converted message packet to the located service provider agent.

10. The method as claimed in claim 9, further comprising the steps of:
(f) receiving a response message packet from said located service provider agent;
(g) converting said received response message packet; and
(h) returning said converted response message packet to said particular regular agent.

11. A community system which controls a plurality of service provider agents for processing a message packet sent from a regular agent, said system comprising;
(a) a facilitator agent for maintaining service provider agent access information and service provider agent classification information; and
(b) a broker agent for;
(b-1) receiving a message packet sent from said regular agent;
(b-2) inquiring of said facilitator agent to determine whether or not a service provider agent having a predetermined service provider agent classification information is available; and
(b-3) sending data including a content of said message packet to said determined available service provider agent.

12. The agent community system as claimed in claim 11, wherein:

a result of said inquiring indicates that a plurality of service provider agents having said predetermined service provider agent classification information are available; and
said sending data sends to each of said plurality of service provider agents; and wherein said broker further comprises:
(b-4) receiving a response message packet from each of said plurality of service provider agents, said response message packets being a processing result of said sent data;
(b-5) converting said received response messages into a single response; and
(b-5) sending said single response message packet to said regular agent.

13. An agent community system comprising:
a broker agent for:
(a) receiving a message packet sent from a regular agent, wherein said message packet contains a reference to a particular service provider agent classification;
(b) retaining a broker advertise table for maintaining service provider agent access information which specifies a service provider agent having predetermined service provider agent information, for each of a plurality of service provider agents which process message packets in said system;
(c) determining whether or not a service provider agent having said particular service provider agent classification is available by consulting said broker advertise table; and
(d) sending data including a content of said message packet to said determined available service provider agent.

14. The agent community system according to claim 13, wherein said broker agent further dynamically updates said broker advertise table so that said broker agent is automatically aware of additional service provider agents having said particular service provider agent classification.

15. The agent community system according to claim 14, wherein said dynamically updating further comprises:
sending, by the broker agent, a subscribe request to a facilitator agent with which service provider agents register their service provider agent access information and classification information, wherein said subscribe request notifies said facilitator agent to automatically tell said broker agent of any additional service provider agents that register and which meet particular criteria defined in the subscribe request; and
automatically sending a notification, by the facilitator agent, to tell said broker agent when an additional service provider agent which meets said particular criteria registers, wherein said automatically sent notification further comprises said additional service provider agent's access information and classification information.

16. The agent community system according to claim 15, wherein said particular criteria is said predetermined service provider agent information.

17. The agent community system according to claim 13, wherein said broker agent further statically updates said broker advertise table, said statically updating further comprising:
requesting, by said broker agent, a facilitator agent with which service provider agents register their service provider agent access information and classification information to tell said broker agent of any registered service provider agents which registered said predetermined service provider agent information; and sending service provider agent access information to said broker agent, by said facilitator agent, for each registered service provider agent which registered said predetermined service provider agent information.

18. The agent community system according to claim 17, wherein said statically updating further comprises sending service provider agent classification information to said broker agent, by said facilitator agent, for each registered service provider agent which registered said predetermined service provider agent information.

19. A message processor comprising an agent community including a regular agent for sending a message packet to request processing of said message packet, a plurality of service provider agents for processing said message packet and a facilitator agent for maintaining service provider agent access information and service provider agent classification information, said processor comprising:

(a) means for receiving, by a broker agent which mediates jobs for one or more regular agents, a message packet sent from a particular one of said regular agents;

(b) means for analyzing, by said broker agent, said received message packet to determine a particular service provider agent classification contained therein;

(c) means for locating by said broker agent, a service provider agent corresponding to said particular service provider agent classification;

(d) means for converting, by said broker agent, said received message packet; and (e) means for sending, by said broker agent, said converted message packet to said located service provider agent.

20. The message processor as claimed in claim 19, wherein:

said means for locating locates a plurality of service provider agents; and said means for sending sends said converted message packet to each of said plurality of service provider agents, and further comprising:

(f) means for receiving, by said broker agent, a response message packet from each of said plurality of service provider agents, each of said response message packets being a processing result of said sent converted message packets;

(g) means for converting, by said broker agent, said received response message packets into a single response message; and (h) means for sending, by said broker agent, said single response message to said regular agent.

* * * * *